US011474900B2

(12) United States Patent
O'Rourke et al.

(10) Patent No.: US 11,474,900 B2
(45) Date of Patent: Oct. 18, 2022

(54) DYNAMIC REBUILD CAPABILITY IN REDUNDANT ARRAY OF INDEPENDENT DISKS (RAID) ARRAYS USING COMPRESSING DRIVES (71) Applicant: INTERNATIONAL BUSINESS MACHINES CORPORATION, Armonk, NY (US)

(72) Inventors: Nicholas Michael O'Rourke, Southampton (GB); Gemma Izen, Winchester (GB); Mark Keith Elliott, Hampshire (GB); Daniel Paul Dent, Totton (GB); Dominic Tomkins, Hook (GB); Alastair Cooper, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 16/984,434

(22) Filed: Aug. 4, 2020

(65) Prior Publication Data

US 2022/0043709 A1 Feb. 10, 2022

(51) Int. Cl.
*G06F 11/20* (2006.01)
*G06F 11/10* (2006.01)
*G06F 11/07* (2006.01)
*G06F 3/06* (2006.01)

(52) U.S. Cl.
CPC ........ *G06F 11/1076* (2013.01); *G06F 3/0619* (2013.01); *G06F 3/0631* (2013.01); *G06F 3/0653* (2013.01); *G06F 3/0659* (2013.01); *G06F 3/0689* (2013.01); *G06F 11/0793* (2013.01); *G06F 11/2094* (2013.01)

(58) Field of Classification Search
CPC ............. G06F 11/2094; G06F 11/3034; G06F 3/0689; G06F 3/0653; G06F 3/0631; G06F 3/0619
See application file for complete search history.

(56) References Cited

U.S. PATENT DOCUMENTS

| 2005/0055603 A1* | 3/2005 | Soran | ................... G06F 3/0631 714/6.32 |
| 2006/0112222 A1* | 5/2006 | Barrall | ............... G06F 11/2094 711/114 |
| 2014/0297951 A1* | 10/2014 | Baptist | ............... G06F 11/1076 711/114 |

(Continued)

OTHER PUBLICATIONS

Disclosed Anonymously, "A Smart Sparing System for Declustered RAID Storage," https://priorart.ip.com/IPCOM/000245964, Apr. 21, 2016, pp. 1-9.

(Continued)

*Primary Examiner* — Yolanda L Wilson
(74) *Attorney, Agent, or Firm* — Kristofer L. Haggerty (57) ABSTRACT Method and system are provided for dynamic rebuild capability in redundant array of independent disks (RAID) arrays using compressing drives. The method includes providing an array including a physical rebuild area for the multiple drives of the array and dynamically adjusting a number of allocated rebuild zones available within the rebuild area, wherein each allocated rebuild zone has capacity to store a drive rebuild based on a current physical usage of the multiple drives of the array.

18 Claims, 8 Drawing Sheets (56) References Cited

U.S. PATENT DOCUMENTS

| | | | | |
|---|---|---|---|---|
| 2014/0325262 A1* | 10/2014 | Cooper | ................ | G06F 11/108 |
| | | | | 714/6.22 |
| 2016/0196075 A1* | 7/2016 | Matsushita | ........... | G06F 3/0647 |
| | | | | 711/103 |
| 2017/0185313 A1* | 6/2017 | Golden | ................... | G06F 3/064 |
| 2017/0315745 A1* | 11/2017 | Agombar | .............. | G06F 3/0631 |
| 2018/0074951 A1* | 3/2018 | Feigin | ................... | G06F 3/0653 |
| 2018/0300212 A1 | 10/2018 | Gong | | |
| 2018/0349224 A1* | 12/2018 | Kazi | ................... | G06F 11/3034 |
| 2019/0188099 A1 | 6/2019 | Roberts | | |
| 2020/0004631 A1 | 1/2020 | Jaquette | | |

OTHER PUBLICATIONS

Mell et al., "The NIST Definition of Cloud Computing", National Institute of Standards and Technology, Special Publication 800-145, Sep. 2011, pp. 1-7.

\* cited by examiner

DYNAMIC REBUILD CAPABILITY IN REDUNDANT ARRAY OF INDEPENDENT DISKS (RAID) ARRAYS USING COMPRESSING DRIVES

BACKGROUND

The present invention relates to dynamic rebuild capability in redundant array of independent disks (RAID) arrays, in particular to RAID arrays using compressing drives.

Rebuild requires that in the event of a drive failure, the data that would normally be on that missing drive is written to space on the remaining drives in the array and the area into which the rebuild data is written is known as a "rebuild area". Some implementations of distributed RAID allow multiple rebuild areas across the array.

Distributed RAID arrays solve rebuild bottlenecks in non-distributed array configurations because rebuild areas are distributed across all the drives in the array. Data can be copied faster to the rebuild area and redundancy is restored much more rapidly. Additionally, as the rebuild progresses, the performance of the pool is more uniform because all of the available drives are used for every volume extent. After the failed drive is replaced, data is copied back to the drive from the distributed spare capacity.

Typically, the rebuild area exists in logical space and is pre-allocated from the logical space. The number of rebuild areas is based on the width of the array. Conventionally, the size of the rebuild area determines how many times the distributed array can recover failed drives without risking becoming degraded.

The advent of compressing drives in RAID requires the management of available physical capacity on the RAID array. When compressing drives are used, the logical to physical usage can vary widely due to the compressibility of the data. Management is required of how much data is allowed by the controlling system on the drives within the array whilst keeping back some space to allow operations such as rebuild.

SUMMARY

According to an aspect of the present invention there is provided a computer-implemented method for dynamic rebuild capability in redundant array of independent disks (RAID) arrays using compressing drives, comprising: providing an array including a physical rebuild area for the multiple drives of the array; and dynamically adjusting a number of allocated rebuild zones available within the rebuild area, wherein each allocated rebuild zone has capacity to store a drive rebuild based on a current physical usage of the multiple drives of the array.

According to another aspect of the present invention there is provided a system for dynamic rebuild capability in redundant array of independent disks (RAID) arrays using compressing drives, comprising: an array including a physical rebuild area for the multiple drives of the array; and a processor and a memory configured to provide computer program instructions to the processor to execute the function of: a dynamic rebuild zone component for dynamically adjusting a number of allocated rebuild zones available within the rebuild area, wherein each allocated rebuild zone has capacity to store a drive rebuild based on a current physical usage of the multiple drives of the array.

According to a further aspect of the present invention there is provided a computer program product for dynamic rebuild capability in redundant array of independent disks (RAID) arrays using compressing drives, the computer program product comprising a computer readable storage medium having program instructions embodied therewith, the program instructions executable by a processor to cause the processor to: provide an array including a physical rebuild area for the multiple drives of the array; and dynamically adjust a number of allocated rebuild zones available within the rebuild area, wherein each allocated rebuild zone has capacity to store a drive rebuild based on a current physical usage of the multiple drives of the array.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are described for facilitating dynamic rebuild capability in redundant array of independent disks (RAID) arrays utilizing compressing drives. The dynamic rebuild capacity is provided by managing a number of available rebuild zones in a rebuild area based on the amount of physically stored data.

The method and system is carried out in a RAID storage controller for controlling a RAID storage that uses compressible drives. The RAID storage may be a traditional RAID storage using a global spare drive as a rebuild area or a distributed RAID storage using a rebuild area distributed across the drives. Logical space is reserved as the rebuild area and the logical space is always addressable and reserved as a logical block addressing (LBA) range.

Some of the logical capacity is always consumed by the rebuild areas, whereas the amount of physically stored data may vary greatly due to the compressibility of data. The variability of the amount of physically stored data due to compressibility is leveraged in the described method and system to allow greater flexibility of recovery and better utilization of the physical capacity when data compression is not very effective.

Figure 1:
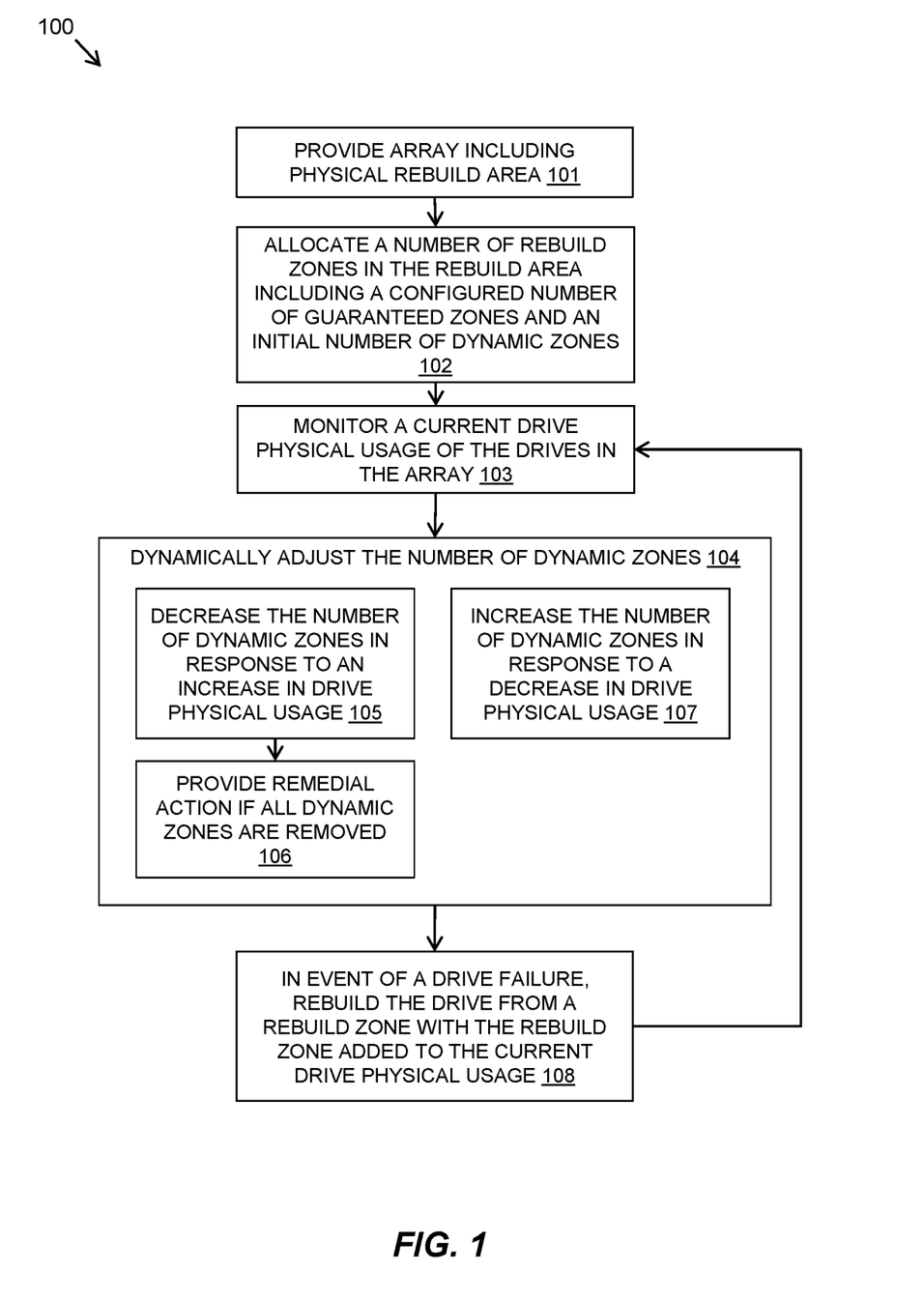
FIG. 1 is a flow diagram of an example embodiment of a method in accordance with the present invention.

Referring to FIG. 1, a flow diagram 100 shows an example embodiment of a method for dynamic rebuild capability in RAID arrays using compressing drives.

The method may provide 101 an array including a physical rebuild area. The rebuild area may be a global spare drive or may be distributed across the multiple drives of the array. The method may allocate 102 a number of rebuild zones in the rebuild area including a configured number of guaranteed zones. The rebuild zone may be carved from the global spare providing the rebuild area or may be distributed across a distributed rebuild area.

A rebuild zone within the rebuild area is of variable size and is based on a current amount of physical usage of the drives. The current physical usage includes data storage and fault tolerance and may be based on a highest individual drive usage of the multiple drives.

The size of the physical rebuild area may accommodate a defined number of guaranteed rebuild zones multiplied by a physical size of a drive. In the case of a distributed rebuild area, if a drive is full of data, a size of a rebuild area of the data would be spread across the rebuild areas of the remaining drives. If two guaranteed rebuild zones are required, the rebuild area size will be required to accommodate a rebuild of two full drives. In the case of a global spare rebuild area, two global spare drives will be needed for two guaranteed rebuild zones. However, the drives will not generally be full of data and therefore the guaranteed rebuild zones will use less than the full rebuild area and the remaining area of the rebuild area can be designated for additional dynamic rebuild zones.

At an initial state, an initial number of dynamic rebuild zones may be provided based on the initial physical usage of the multiple drives of the array.

The method may monitor 103 the current physical usage of the multiple drives of the array based on a highest individual drive usage of the multiple drives. As the array uses compressing drives, the current data usage may be based on an amount of compression available as well as the amount of data.

The method may dynamically adjust 104 a number of allocated rebuild zones available, with each allocated rebuild zone having capacity to store a drive rebuild based on a current physical usage of the multiple drives of the array.

This dynamic adjustment may include decreasing 105 the number of allocated rebuild zones whilst maintaining the guaranteed minimum number of zones in response to an increase in the current physical usage. In the event of an increased drive physical usage being such that the guaranteed minimum number of zones is not sufficient, the method may provide 106 a remedial action. The remedial action may include: blocking writes, compromising a rebuild, reconfiguring the number of guaranteed rebuild zones, copyback of the rebuild data to a replacement drive to free the rebuild area and reduce the overall physical usage, data migration, and data deletion.

The dynamic adjustment may also include increasing 107 the number of allocated rebuild zones within a defined maximum number of zones in response to a decrease in the current physical usage. Decreasing 105 and increasing 107 the number of allocated rebuild zones may be carried out by varying the number of dynamic zones.

In the event of a drive failure, a rebuild 108 may be carried out of the drive from a rebuild zone. When this occurs, the current physical usage is adjusted to include the rebuild zone use.

The described method manages the number of available rebuild zones based on the amount of stored data, making the physical storage usage as efficient as possible while still maintaining the ability to restore redundancy in the event of failure. When compressing drives are used, the logical to physical usage can vary widely due to the compressibility of the data and the extra physical space may otherwise be wasted. Varying the number of rebuild zones allows tolerance and rapid return to full redundancy when multiple drives fail, while allowing efficient use of the available physical storage.

The rebuild allocation needed to retain the user required space in physical space to meet set requirements is dynamically calculated and the number of available rebuild zones then becomes dynamic.

For customers who have highly compressible data, using the described method will provide a high level of protection. With compressing drives the data compressibility is not known before the array is created and the described method makes the management of rebuild zones more flexible as the data amounts and compressibility change over use.

Conventionally, the number of rebuild areas is fixed at array creation time and is purely based on the logical space capabilities of the array. The amount of space allocated to rebuild areas is fixed in proportion to the space available for customer data. The described method proposes adjusting this proportion and thus providing the ability to provide many rebuild zones when data is low or highly compressed while maintaining a guarantee of some rebuild capability when data usage is high or data compression is less effective.

In the following description, the following terms are used to describe the method further:

Guaranteed rebuild zone count (G)—The number of rebuilds that will always be possible.

Dynamic rebuild zone count (D)—The additional number of rebuilds that may be possible given high compression ratio or low data usage overall.

Rebuild area physical allocation—Number of guaranteed rebuild zones multiplied by the physical size of one drive. Since a rebuild zone must be able to store the data that normally resides on the missing drive.

Available rebuild zones—The combined number of Dynamic and Guaranteed rebuild zones available currently, based on physical storage usage.

Maximum Rebuild Area Count (M)—The maximum number of rebuild zones.

An array may be created with a maximum number of rebuild zones M, of which some are guaranteed rebuild zones G, the array is managed with a physical rebuild area size defined by the guaranteed amount. The physical allocation for the rebuild area remains the same regardless of how many rebuild zones are active.

Initially with no data, the available rebuild zones count is the maximum M. Data is written to the array, using some physical storage and a monitoring mechanism monitors the drive physical usage regularly.

If drive physical usage exceeds the level at which the data will no longer fit into the dynamic and guaranteed rebuild zones, then the dynamic number is reduced. If drive physical usage reduces, the number of available rebuild zones is increased up to the maximum M.

If an error occurs, such as a drive failure, and rebuild begins, a rebuild zone is considered to be in use and physical usage calculation must compensate for the additional usage and can retain the additional rebuild zones and dynamic rebuild zones so long as the total "real" data does not exceed limits that would risk the ability to use these rebuild zones.

If physical data increases to the point where the guaranteed rebuild zones are no longer sufficient then either writes may be blocked or rebuild may be further compromised.

Users may be allowed to set or change the configuration to reduce or increase the number of guaranteed rebuild zones, so long as there is enough physical free to retain the necessary guarantees.

Figure 2A:
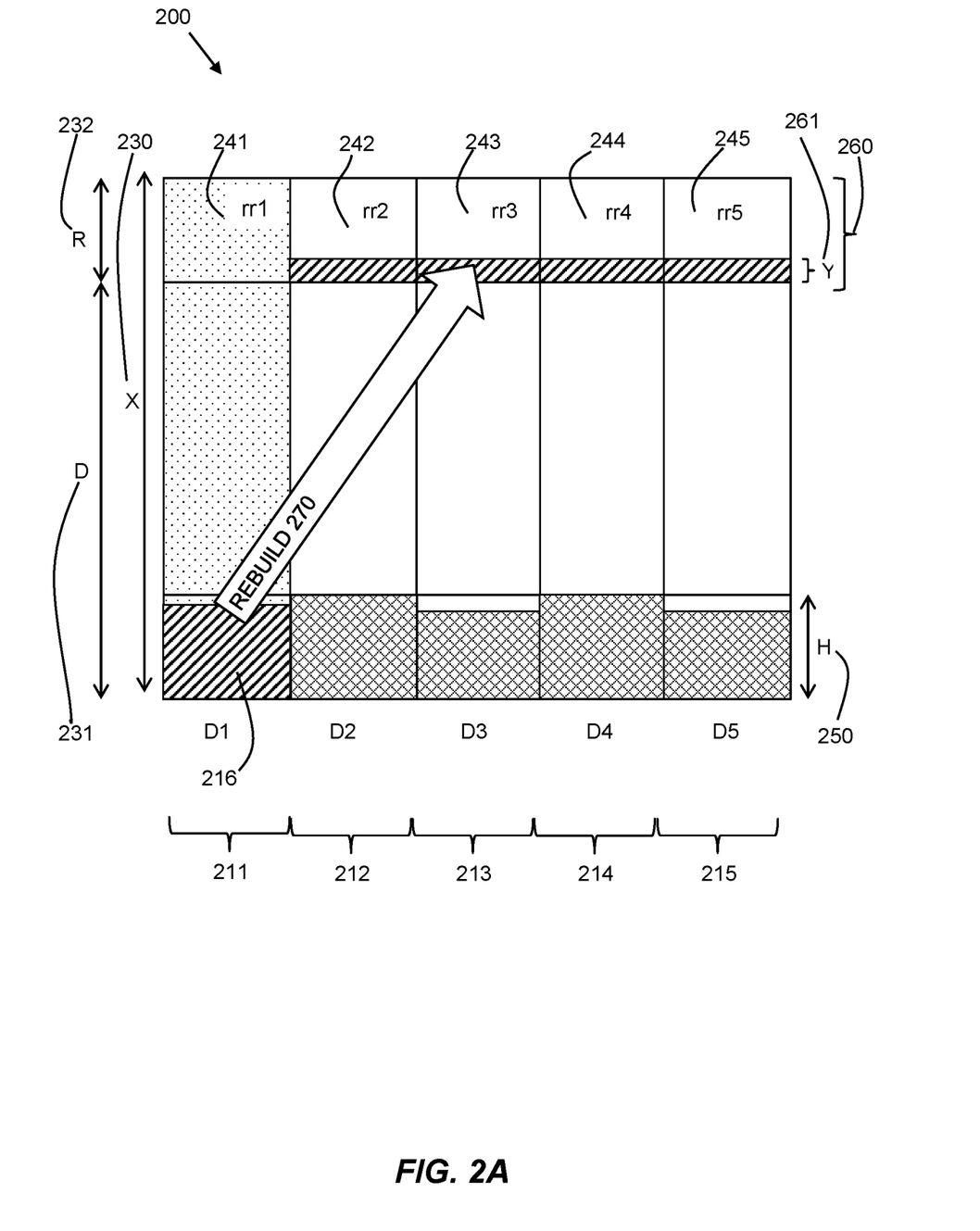
FIG. 2A is a schematic diagram of a RAID storage array illustrating a rebuild area as known in the prior art.
Figure 2B:
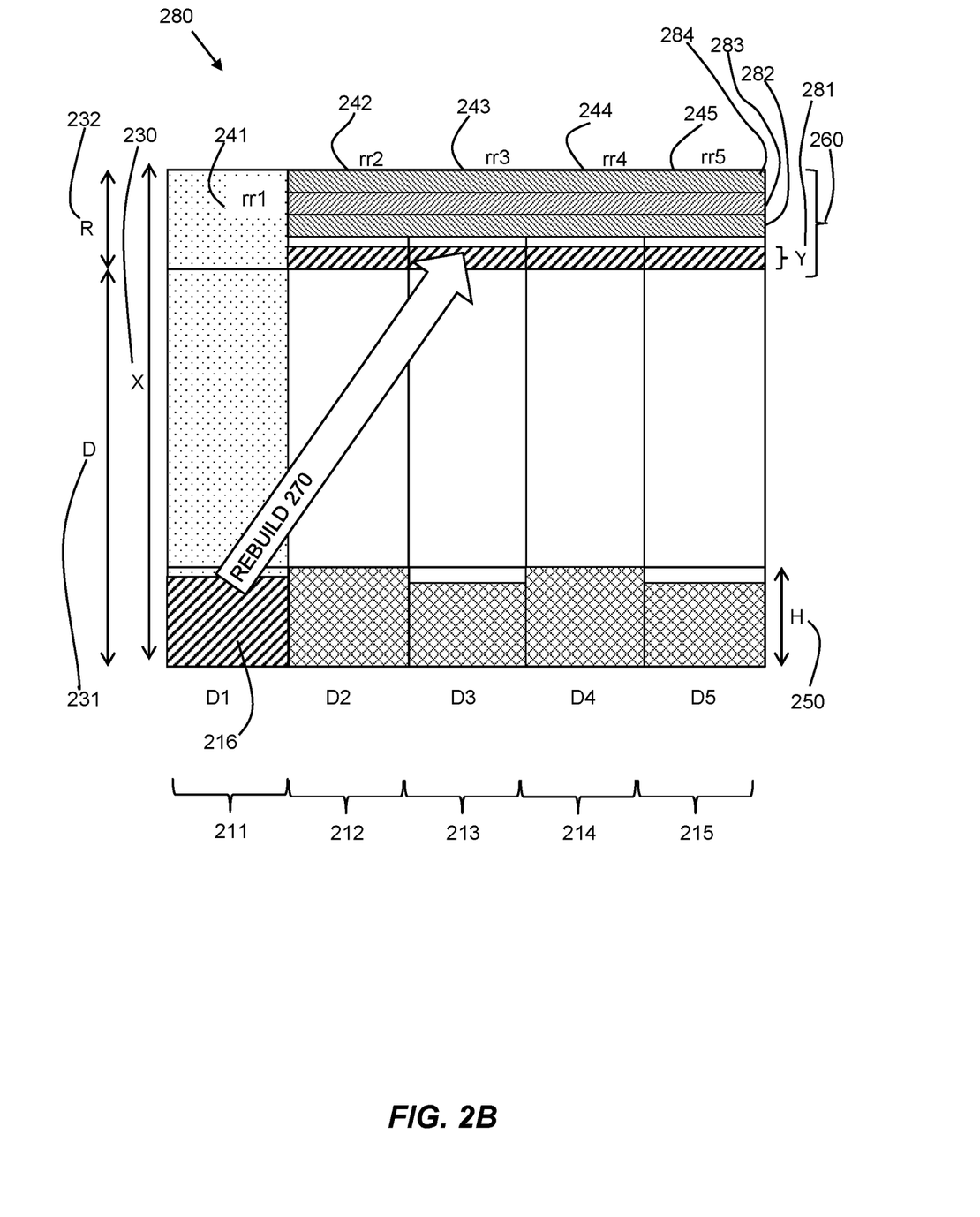
FIG. 2B is a schematic diagram of a RAID storage array illustrating a dynamic rebuild area allocation in accordance with an example embodiment of the present invention.
Figure 2C:
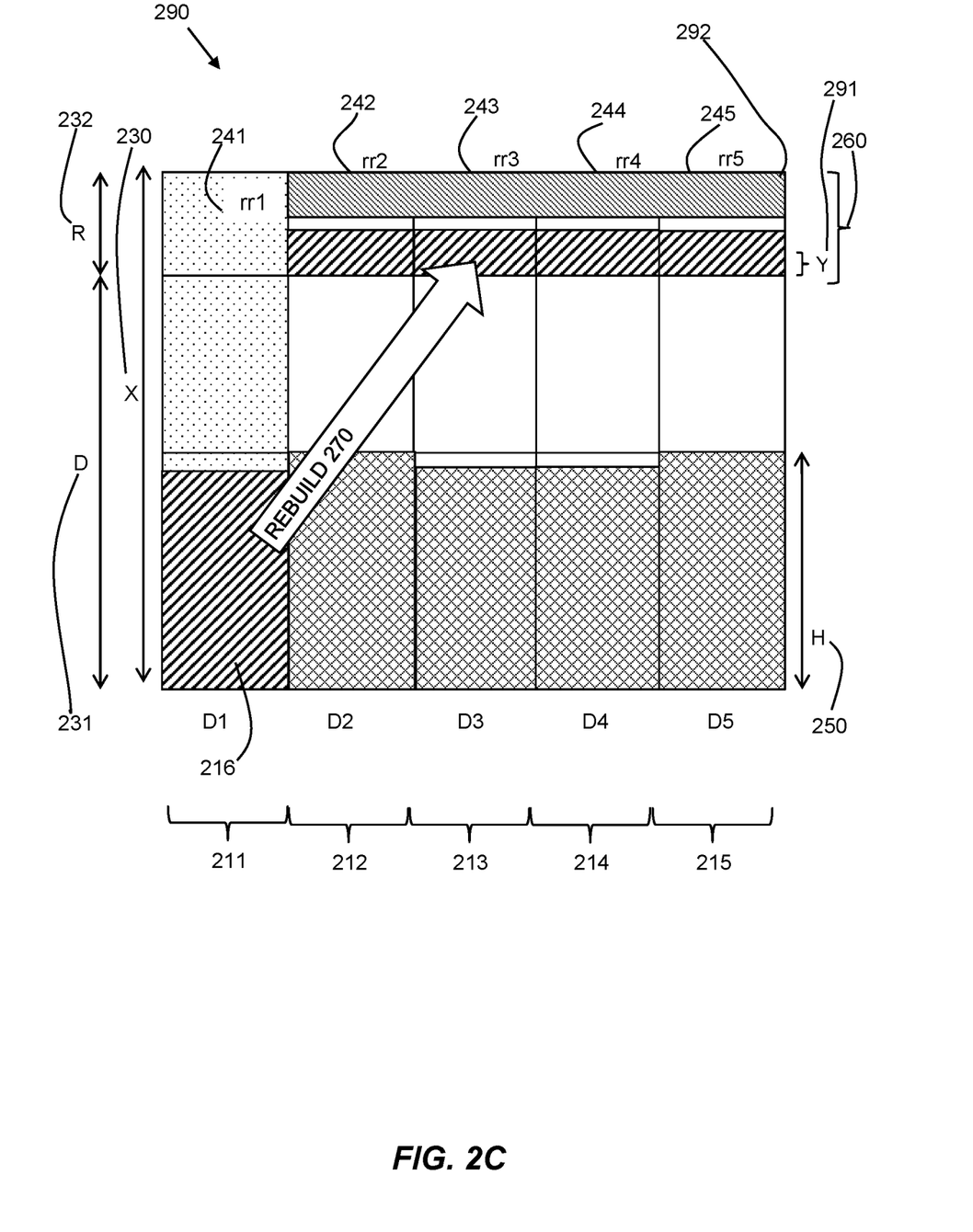
FIG. 2C is a schematic diagram of a RAID storage array illustrating a dynamic rebuild area allocation in accordance with another example embodiment of the present invention.

Referring to FIGS. 2A-2C, a schematic diagram shows an example embodiment of a physical representation of a distributed array 200 with compressing drives shown as five drives D1-D5 211-215 and using a distributed rebuild area.

Each drive 211-215 has a physical capacity X 230 formed of a data area D 231 for (Data+Parity+QParity) and a rebuild data area R 232. The physical allocation of the rebuild data areas rr1-rr5 241-245 across the drives 211-215 in the array 200 is equal to the physical capacity X 230 of a drive 211-215 (i.e. enough space to rebuild one drive in a worst case when the failed drive is full). A highest used capacity across the drives 211-215 is shown as H 250.

In FIG. 2A, a typical known arrangement is shown with a single rebuild area 260. In the shown example, the array member drives D1-D5 211-215 start with 20% of the customer area consumed. One drive, D1 211, fails and its data 216 is rebuilt 270 as area Y 261 into the logical rebuild areas rr2-rr5 242-245 on the remaining drives D2-D5 212-215. Only 20% of the rebuild area capacity 260 is used, with the rest wasted and not usable for further rebuilds.

Referring to FIG. 2B, a first example embodiment is shown 280 with a maximum of four rebuild zones 281-284 with one guaranteed rebuild zone 281.

As in FIG. 2A, the array member drives D1-D5 211-215 start with 20% of the customer area consumed. One drive, D1 211, fails and its data 216 is rebuilt 270 to area Y 261 in the logical rebuild areas rr2-rr5 242-245 on the remaining drives D2-D5 212-215. However, the rebuild area, which is the same overall size 260 as in FIG. 2A, is now dynamic and may contain multiple additional rebuilds in rebuild zones 282-284, if required, in addition to the current rebuild 261 in the guaranteed area 281.

Referring to FIG. 2C, a second example embodiment is shown 290 with a maximum of two rebuild zones 291, 292 with one guaranteed rebuild zone 291 due to data growth.

In this embodiment, the array member drives D1-D5 211-215 start with 50% of the customer area consumed. One drive, D1 211, fails and its data 216 is rebuilt 270 in area Y 291 into the logical rebuild areas rr2-rr5 242-245 on the remaining drives D2-D5 212-215.

However, the rebuild area, which is the same overall size 260 as in FIG. 2A, is now dynamic and may contain another rebuild in rebuild zone 292, if required, in addition to the current rebuild in the guaranteed area 291. Current data limits the total rebuilds that will fit to only two rebuilds 291, 292. If data grows further, the available rebuild zones would be reduced to one.

Figure 3:
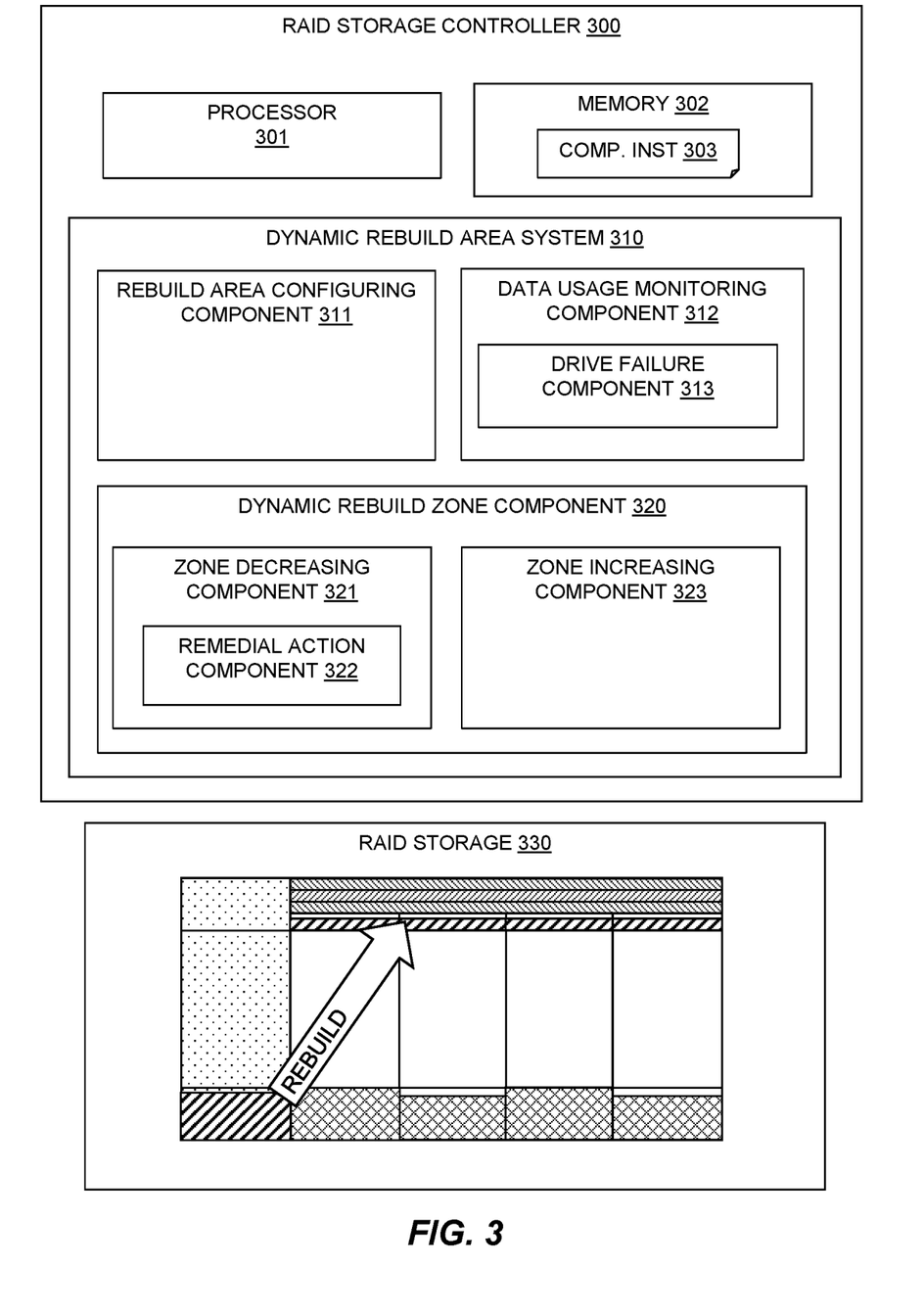
FIG. 3 is block diagram of an example embodiment of a system in accordance with the present invention.

Referring to FIG. 3, a block diagram shows an example embodiment of a RAID storage controller 300 for controlling a RAID storage 330 that uses compressible drives. The RAID storage 330 may be a traditional RAID storage using a global spare drive as a rebuild area or a distributed RAID storage using a rebuild area distributed across the drives. Logical space is reserved as the rebuild area and the logical space is always addressable and reserved as a logical block addressing (LBA) range. Some of the logical capacity is always consumed by the rebuild areas whereas the physical capacity required may be highly variable due to data compression.

The RAID storage controller 300 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The RAID storage controller 300 may include a dynamic rebuild area system 310 for providing dynamic rebuild capability in the RAID storage 330 by dynamically adjusting a number of allocated rebuild zones available within the rebuild area, with each allocated rebuild zone having capacity to store a drive rebuild based on a current physical usage of the multiple drives of the array.

The dynamic rebuild area system 310 may include a rebuild area configuring component 311 for defining a physical rebuild area with a defined maximum number of allocated rebuild zones including a configured guaranteed number of rebuild zones and an initial number of dynamic rebuild zones based on an initial drive physical usage. The defined physical rebuild area may be provided as one or more global spare drives or as a distributed rebuild area over distributed drives.

The dynamic rebuild area system 310 may include a data usage monitoring component 312 for monitoring the current physical usage including data storage and fault tolerance and based on a highest individual drive usage of the multiple drives. The data usage monitoring component 312 may include a drive failure component 313 to compensate for the use of the rebuild zone as real data.

The dynamic rebuild area system 310 may include a dynamic rebuild zone component 320 including: a zone decreasing component 321 for decreasing the number of allocated rebuild zones whilst maintaining a guaranteed minimum number of zones in response to an increase in the current physical usage; and a zone increasing component 323 for increasing the number of allocated rebuild zones within a defined maximum number of zones in response to a decrease in the current physical usage.

The zone decreasing component 321 may include a remedial action component 322 for providing a remedial action in the event of increased drive physical usage such that the guaranteed minimum number of zones is not sufficient.

Figure 4:
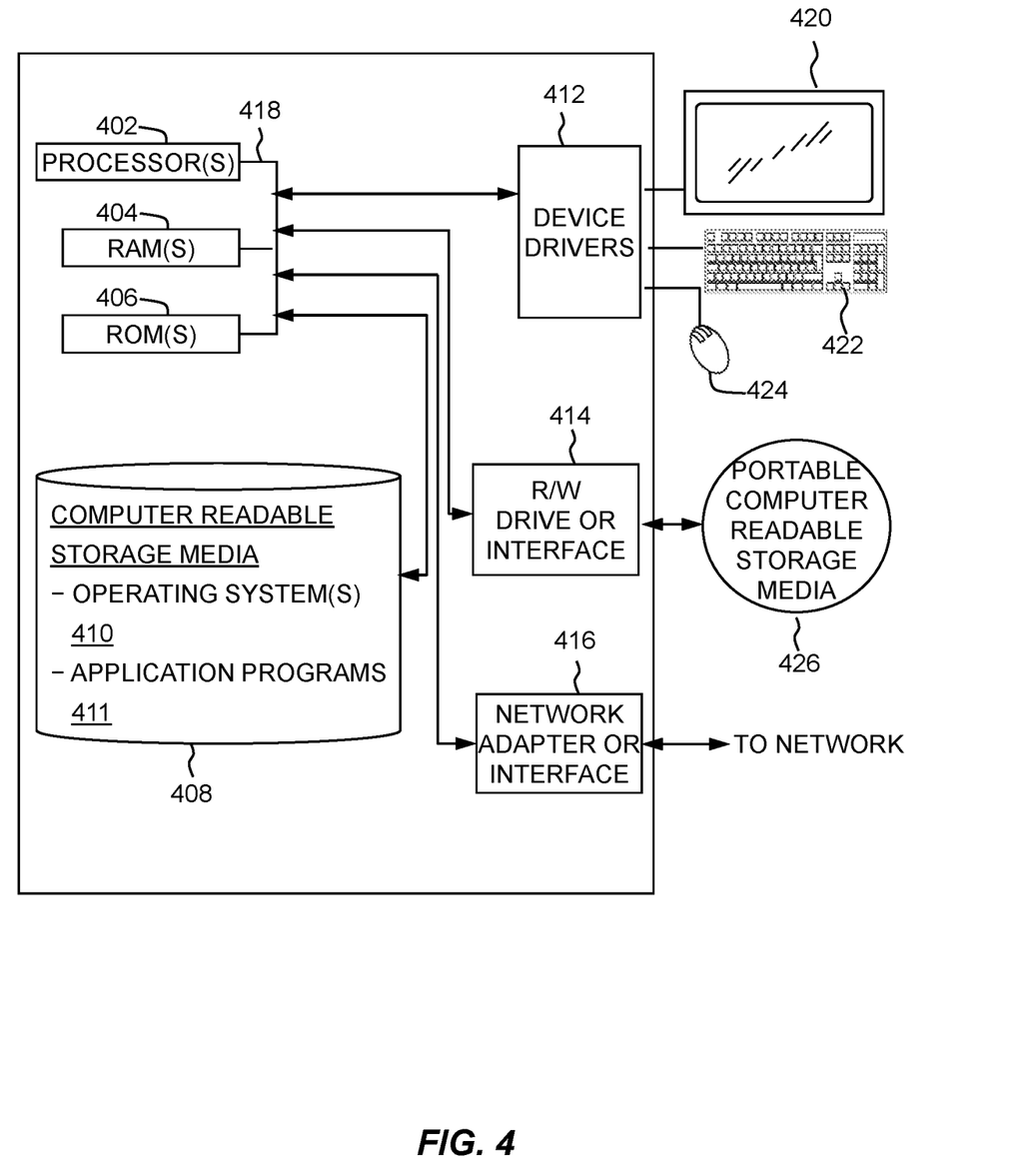
FIG. 4 is a block diagram of an embodiment of a computer system or cloud server in which the present invention may be implemented.

FIG. 4 depicts a block diagram of components of a computing system, such as the RAID storage controller 300, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

The computing system can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 414 to read from and write to one or more portable computer readable storage media 426. Application programs 411 on computer system can be stored on one or more of the portable computer readable storage media 426, read via the respective R/W drive or interface 414 and loaded into the respective computer readable storage media 408.

The computing system can also include a network adapter or interface 416, such as a TCP/IP adapter card or wireless communication adapter. Application programs 411 on the computer system can be downloaded to the computing system from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

The computing system can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
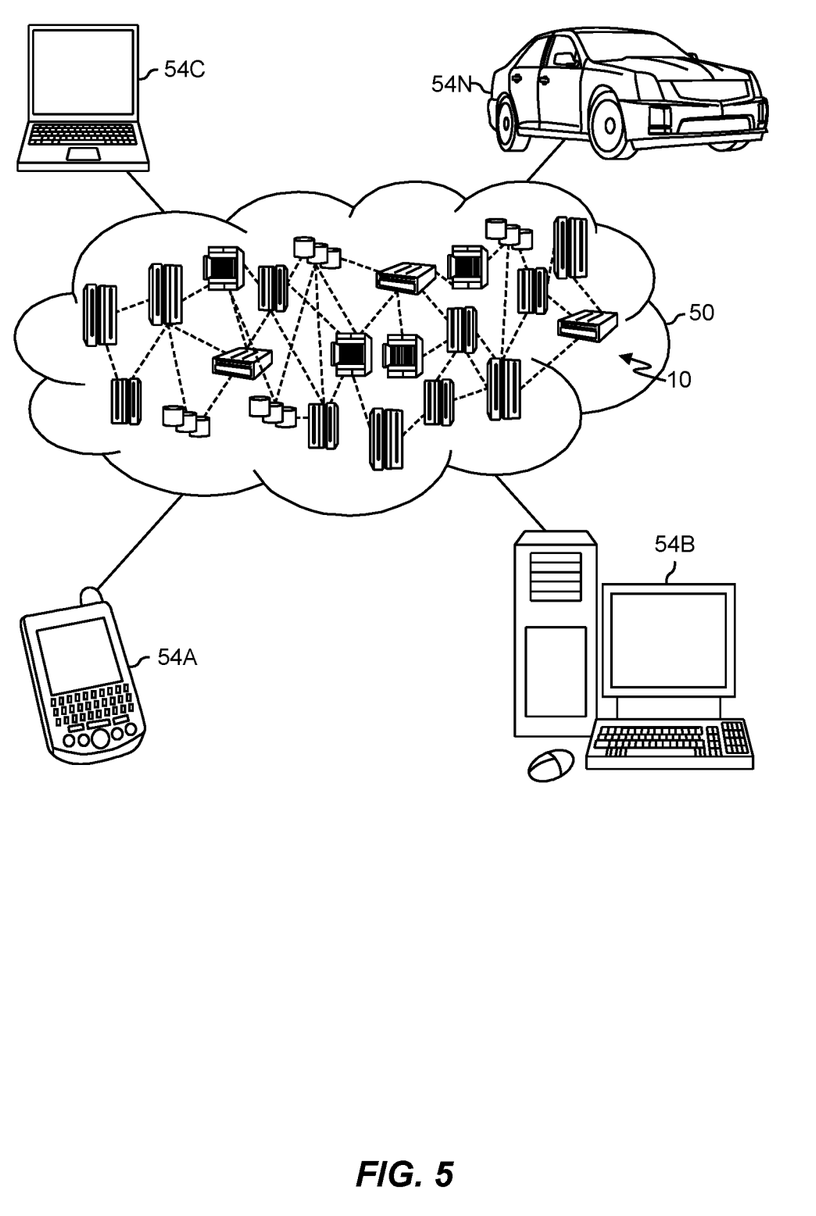
FIG. 5 is a schematic diagram of a cloud computing environment in which the present invention may be implemented.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
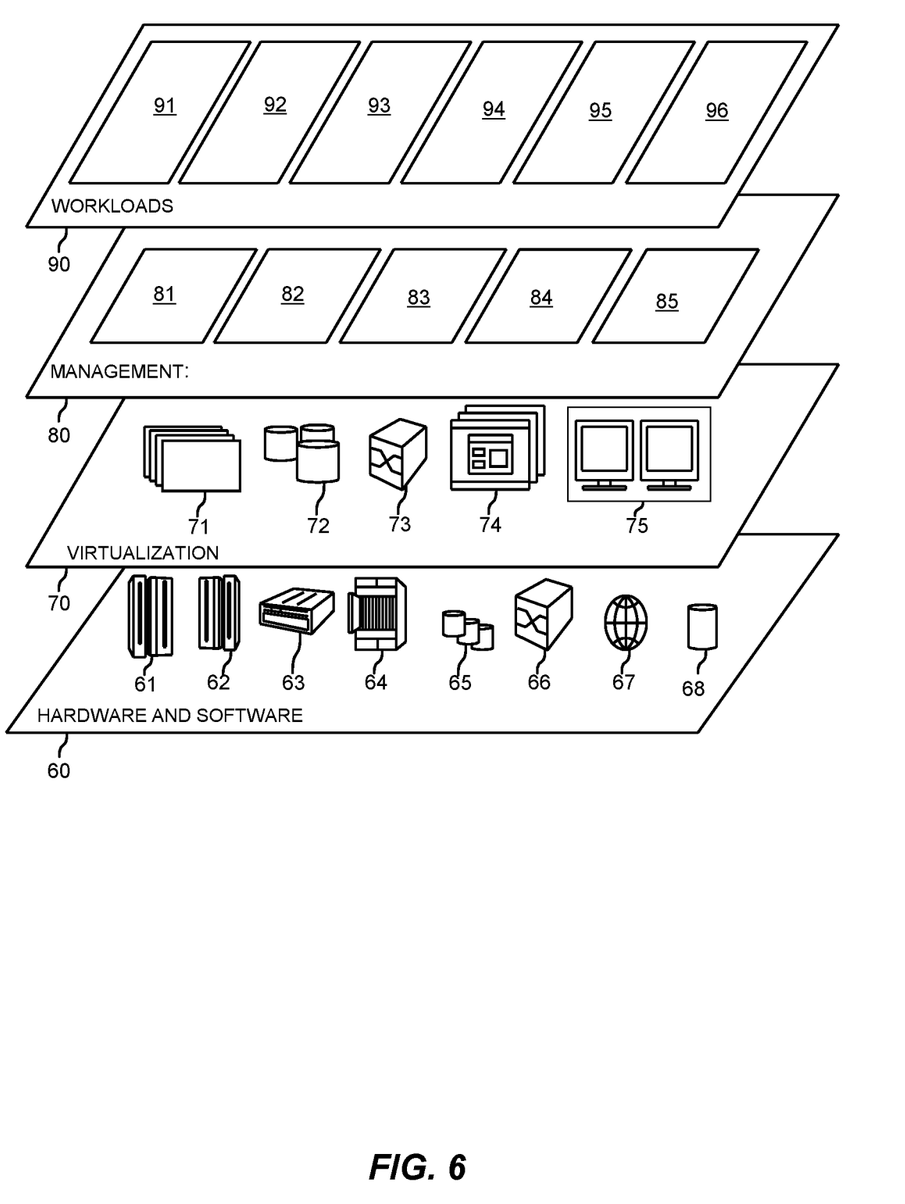
FIG. 6 is a diagram of abstraction model layers of a cloud computing environment in which the present invention may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a storage controller dynamic rebuild area processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for dynamic rebuild capability in redundant array of independent disks (RAID) arrays using compressing drives, comprising:
    providing an array including a physical rebuild area for the multiple drives of the array;
    dynamically adjusting a number of allocated rebuild zones available within the rebuild area, wherein each allocated rebuild zone has capacity to store a drive rebuild based on a current physical usage of the multiple drives of the array; and
    monitoring the current physical usage of the multiple drives of the array including an amount of compression being used, wherein the current physical usage includes data storage and fault tolerance and is based on a highest individual drive usage of the multiple drives.

2. The method as claimed in claim 1, wherein, in the event of a drive failure and a rebuild zone being in use, the current physical usage includes the rebuild zone use.

3. The method as claimed in claim 1, wherein dynamically adjusting a number of allocated rebuild zones includes:
   decreasing the number of allocated rebuild zones whilst maintaining a guaranteed minimum number of zones in response to an increase in the current physical usage; and
   increasing the number of allocated rebuild zones within a defined maximum number of zones in response to a decrease in the current physical usage.

4. The method as claimed in claim 3, wherein providing an array includes defining the physical rebuild area with a defined maximum number of allocated rebuild zones including a configured guaranteed number of rebuild zones and an initial number of dynamic rebuild zones based on an initial drive physical usage.

5. The method as claimed in claim 4, wherein decreasing and increasing the number of allocated rebuild zones varies the number of dynamic rebuild zones.

6. The method as claimed in claim 3, wherein, in the event of increased drive physical usage such that the guaranteed minimum number of zones is not sufficient, providing a remedial action.

7. The method as claimed in claim 6, wherein the remedial action is one or more of the group of: blocking writes, compromising a rebuild, reconfiguring the number of guaranteed rebuild zones, copyback of the rebuild data to a replacement drive to free the rebuild area, data migration, and data deletion.

8. The method as claimed in claim 3, wherein a size of the physical rebuild area is the number of guaranteed rebuild zones multiplied by a physical size of a drive.

9. The method as claimed in claim 1, wherein the physical rebuild area is a distributed physical rebuild area across multiple drives of the array, and
   wherein an allocated rebuild zone is provided across active drives of the rebuild area.

10. The method as claimed in claim 1, wherein the physical rebuild area is one or more spare drives in the array, and
    wherein an allocated rebuild zone is a provided in the one or more spare drives of the physical rebuild area.

11. A system for dynamic rebuild capability in redundant array of independent disks (RAID) arrays using compressing drives, comprising:
    an array including a physical rebuild area for the multiple drives of the array; and
    a processor and a memory configured to provide computer program instructions to the processor to execute the function of:
    a dynamic rebuild zone component for dynamically adjusting a number of allocated rebuild zones available within the rebuild area, wherein each allocated rebuild zone has capacity to store a drive rebuild based on a current physical usage of the multiple drives of the array; and
    a data usage monitoring component for monitoring the current physical usage including an amount of compression being used, wherein the current physical usage includes data storage and fault tolerance and is based on a highest individual drive usage of the multiple drives.

12. The system as claimed in claim 11, including a drive failure component for, in the event of a drive failure and a rebuild zone being in use, providing the current physical usage includes the rebuild zone use.

13. The system as claimed in claim 11, wherein the dynamic rebuild zone component includes:
    a zone decreasing component for decreasing the number of allocated rebuild zones whilst maintaining a guaranteed minimum number of zones in response to an increase in the current physical usage; and
    a zone increasing component for increasing the number of allocated rebuild zones within a defined maximum number of zones in response to a decrease in the current physical usage.

14. The system as claimed in claim 13, including a rebuild area configuring component for defining the physical rebuild area with a defined maximum number of allocated rebuild zones including a configured guaranteed number of rebuild zones and an initial number of dynamic rebuild zones based on an initial drive physical usage.

15. The system as claimed in claim 13, wherein, the zone decreasing component includes a remedial component for providing a remedial action in the event of increased drive physical usage such that the guaranteed minimum number of zones is not sufficient.

16. The system as claimed in claim 11, wherein the physical rebuild area is a distributed physical rebuild area across multiple drives of the array, and
    wherein an allocated rebuild zone is provided across active drives of the rebuild area.

17. The system as claimed in claim 11, wherein the physical rebuild area is one or more spare drives in the array, and
    wherein an allocated rebuild zone is a provided in the one or more spare drives of the physical rebuild area.

18. A computer program product for dynamic rebuild capability in redundant array of independent disks (RAID) arrays using compressing drives, the computer program product comprising a computer readable storage medium having program instructions embodied therewith, the program instructions executable by a processor to cause the processor to:
    provide an array including a physical rebuild area for the multiple drives of the array;
    dynamically adjust a number of allocated rebuild zones available within the rebuild area, wherein each allocated rebuild zone has capacity to store a drive rebuild based on a current physical usage of the multiple drives of the array; and
    monitor the current physical usage of the multiple drives of the array including an amount of compression being used, wherein the current physical usage includes data storage and fault tolerance and is based on a highest individual drive usage of the multiple drives.

\* \* \* \* \*